J. Foster,
Fish Flake.
Nº 67,970.   Patented Aug. 20, 1867.
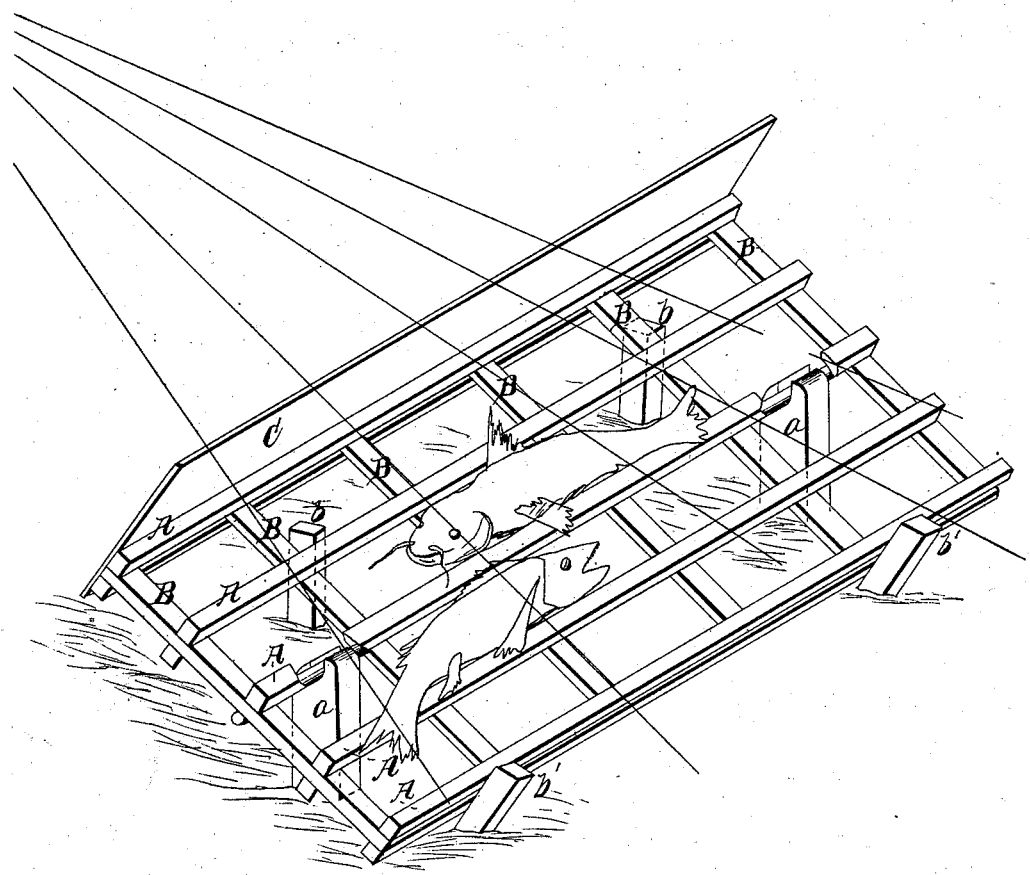
Witnesses.
Thos Insche
J. A. Service.
Inventor.
Joseph Foster
Per Munn & Co
Attorneys

United States Patent Office.

JOSEPH FOSTER, OF BEVERLY, MASSACHUSETTS.

Letters Patent No. 67,970, dated August 20, 1867.

IMPROVED FISH-FLAKE.

*The Schedule referred to in these Letters Patent and making part of the same.*

TO ALL WHOM IT MAY CONCERN:

Be it known that I, JOSEPH FOSTER, of Beverly, Essex county, Massachusetts, have invented a new and improved Fish-Flake; and I do hereby declare that the following is a full, clear, and exact description thereof, which will enable others skilled in the art to make and use the same, reference being had to the accompanying drawings, forming part of this specification, in which—

The drawing represents a perspective view of my improved fish-flake.

The object of this invention is to provide a fish-flake or frame for curing cod and other fish by drying, which is so arranged as to be adjustable in its position for exposing the fish more or less to the sun as required, and protecting them from his rays in the heat of the day by means of a screen.

A A are wooden slats running lengthwise, and B B slats running crosswise and forming the frame of the fish-flake, at such distances apart that the fish can lie between the slats longitudinally and be supported by the slats transversely, as shown in the drawing, for drying without touching each other, and having a free circulation of air around them. The frame is hung centrally upon posts, $a\ a$, in such manner that it can be placed level, or tilted at an angle of nearly forty-five degrees when required, and on one side are short fixed upright posts, $b\ b$, and on the other side posts $b'\ b'$, of the same height, but made so that they can be inclined or placed upright, as desired. These posts $b\ b'$, on opposite sides of the fish-flake, support it when it is level. On the side of the frame, over the fixed posts $b\ b$, I attach a sun-screen, C, made of yard-wide coarse cotton cloth or other suitable material, which shades the fish in the heat of the day from the direct rays of the sun, and thus dries them in the shade entirely better, and with less liability to spoiling from excessive heat. The frame is placed in an east and west position longitudinally, with the sun-screen C on the southern side, so that when the frame is tilted up at angle as seen in the drawing, by displacing the posts $b'\ b'$ at the foot, the screen then protects the fish from the rays of the sun.

Having thus described my invention, what I claim as new, and desire to secure by Letters Patent, is—

The arrangement of a sun-screen C, in combination with the frame of a fish-flake suspended on posts $a\ a$, and operating substantially as and for the purposes described.

The above specification of my invention signed by me this 19th day of February, 1867.

JOSEPH FOSTER.

Witnesses:
    JAMES HILL,
    JOSIAH A. HASKELL.